Mar. 27, 1923.
F. E. VOORHIES
1,449,847
COTTON SEED LINTING MACHINE
Filed Apr. 21, 1920  2 sheets-sheet 1
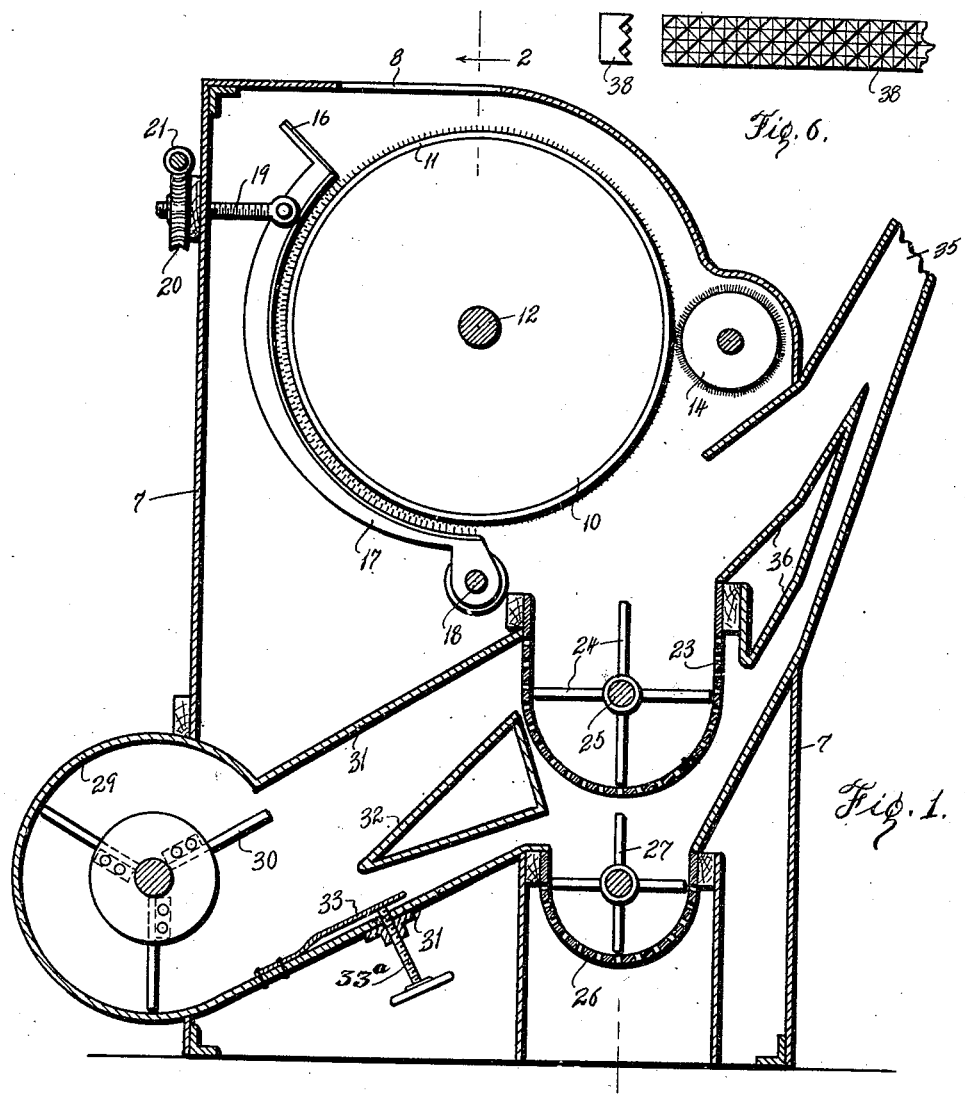
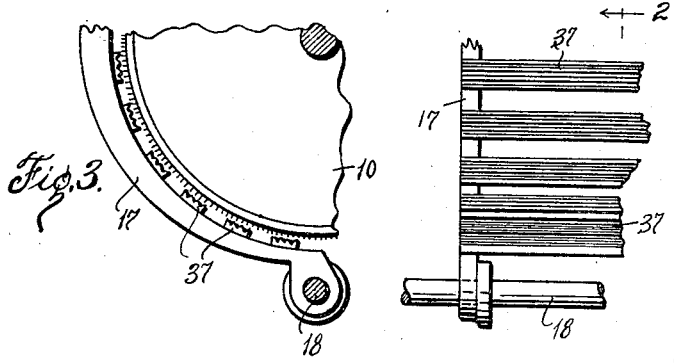
INVENTOR
Felix E. Voorhies

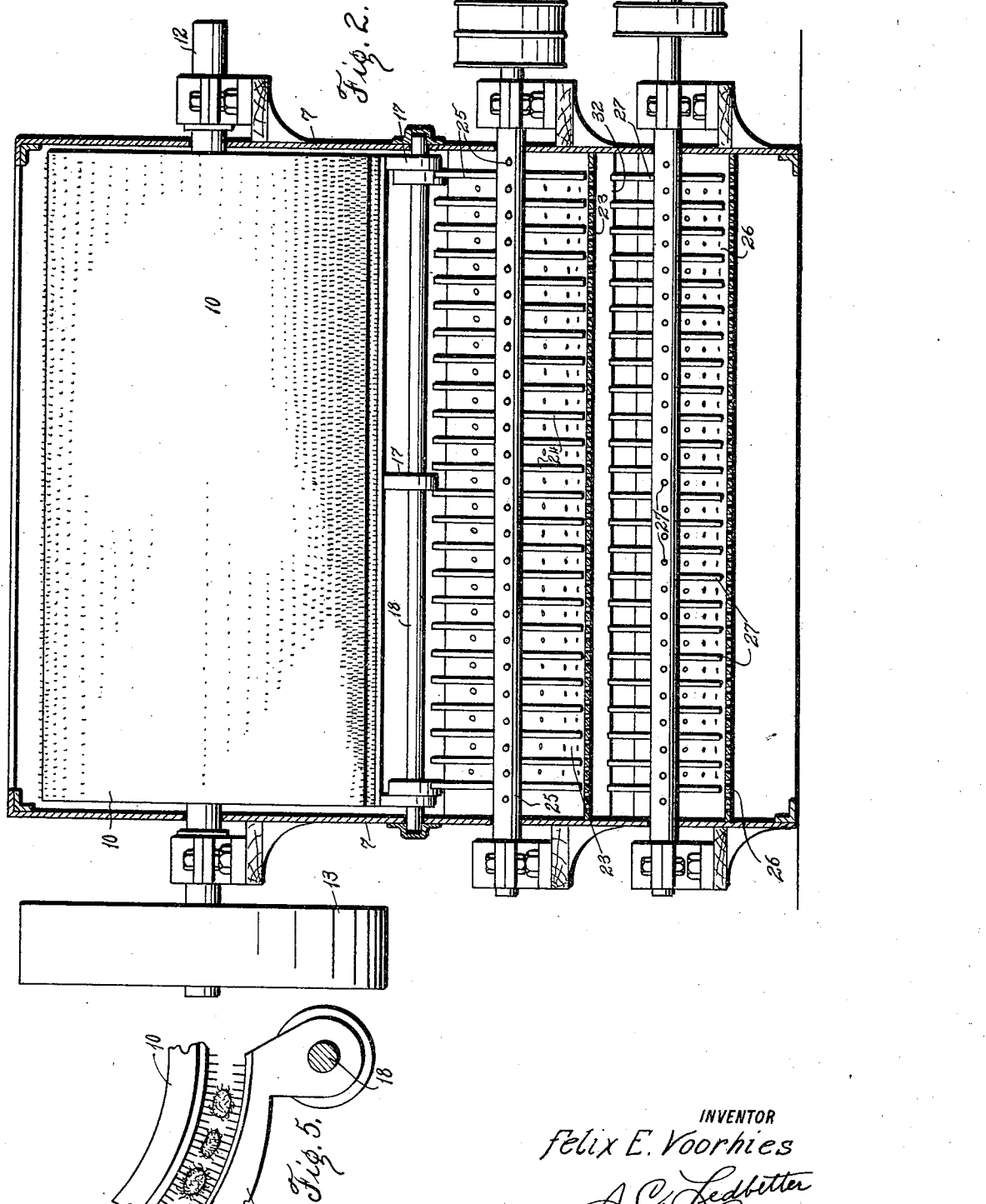

Patented Mar. 27, 1923.

1,449,847

UNITED STATES PATENT OFFICE.

FELIX E. VOORHIES, OF DALLAS, TEXAS.

COTTONSEED-LINTING MACHINE.

Application filed April 21, 1920. Serial No. 375,449.

*To all whom it may concern:*

Be it known that I, FELIX E. VOORHIES, a citizen of the United States, residing at Dallas, in the county of Dallas and State of Texas, have invented certain new and useful Improvements in Cottonseed-Linting Machines, of which the following is a specification.

This invention relates to cotton machinery, and especially to cotton seed machinery. More particularly the invention relates to cotton seed linters used for the purpose of removing the lint or fuzz from cotton seed.

The primary object of this invention is to produce new and improved cotton seed linting machines for use in gin plants for linting and cleaning cotton seed to make the seed ready for oil mill operations in extracting the oil from the seed, and also to prepare the seed for planting in agricultural enterprises.

An additional object is to improve linting machines generally over the invention shown in my Patents Number 1,308,823, and 1,353,295.

A particular purpose of the present invention is to produce a cotton seed linting machine simple in construction and operation, one which will occupy comparatively small space, and which will lint cotton seed on a quantity basis to render practical the operation of the machine in connection with gin plants.

A further object of the invention is to produce linting machines embodying a linter element which effectively cuts the lint and fuzz from the seed, and also embodying a separating element which effectively separates the cut lint from the seed disposing of the lint and seed in a positively separated condition.

An additional feature and purpose of the invention is to produce a cotton seed linting machine, having new and improved lint cutting features, and also having new and improved lint and seed separating features.

With the above principal objects and others in view, the invention has relation to a certain construction and arrangement of parts, several variations in construction and operation of which are set forth in the appended claims defining this invention, and one practical embodiment of which is described in the following specification, and illustrated in the accompanying drawings, wherein:

Figure 1 illustrates a vertical cross sectional view taken through the linting machine to disclose the interior working parts thereof.

Figure 2 shows a vertical sectional view taken through the machine at right angles to Figure 1, and more particularly on the line 2—2 of Figure 1.

Figure 3 illustrates a fragmentary detail view of improved lint cutting and stripping means including stripper bars and a revolving linter drum.

Figure 4 shows a fragmentary face view of the stripper bars shown in Figure 3, the drum being removed therefrom to clearly disclose the cutting edges of the stripper bars.

Figure 5 shows a detail fragmentary view of a linting drum working in close relation to a stationary carder breast with seed interposed therebetween being acted on by the teeth of the linting elements.

Figure 6 shows a face view and end projection of a stripper or linter bar used to cut lint from the seed.

A cotton seed linter constructed in accordance with the plans of this invention employs a lint cutting or stripping means for removing the lint from cotton seeds. A separating hopper is used to catch the cut lint and seed as it comes from the lint cutting and stripping mechanism, and this, in conjunction with an air pressure system, acts to separate the cut lint from the seed. The seeds are dropped from the separating hopper to a seed receptacle where the seeds are passed from the machine and the lint is driven from the separating hopper with an air blast.

The linting machine is particularly characterized by certain improved lint stripping bars and carder points working in close association therewith; and an air blast system is employed to project a stream of air through and under the separating hopper to carry away the cut lint while the mass of seed and lint within the hopper is being agitated to loosen and free the lint from the seed.

In presenting a more detailed disclosure of the invention, there is shown in the drawings a casing 7 with an opening 8 in the upper part thereof for the reception of cotton seed to be linted. The bottom of the casing 7 is left open, through which the linted seeds are disposed after being linted and cleaned.

A linter drum 10 is journaled in the upper part of the casing and is provided with carder cloth 11 wrapped about the periphery of the drum and having closely spaced carder points or teeth. The carder cloth 11 with its closely spaced carder points is well known to those versed in the art, and is employed in this machine for carrying out the lint cutting operations executed against the seed. It is practical to mount the drum 10 on a shaft 12, and attach a drive pulley 13 for rotating the drum 10 at suitable speed. A picker drum, or lint cleaning drum 14, is journaled in the casing of the machine in close relation to the periphery of the linting drum 10. The picker drum 14 is provided with bristle brushes and employed for the purpose of cleaning lint and seed from the linter drum carding points.

A stationary carder breast or frame 17 is pivotally carried on a shaft 18 and made concentric with the revolving linter drum. The carder breast 17 is likewise provided with carder cloth having a great number of closely spaced sharp pointed carder teeth which work in close relation with the points of the revolving linter drum. The upper end of the stationary carder breast 17 is provided with a lip 16 which projects upwardly and to the rear of the seed opening 8 in order to guide seeds directly into the revolving drum and carder breast. A threaded bar 19 is connected with the carder breast 17 and projects through the casing where a worm wheel 20 is confined on the bar. A worm gear 21 meshes with the worm wheel 20, and a crank or wheel, or other suitable means, is connected with the worm gear 21 to impart rotation to the worm wheel 20 and thereby move the upper end of the carder breast 17 inwardly and outwardly relative to the periphery of the revolving linter drum. The worm adjustment is used in securing the proper spaced and working relation between the carder points of the breast 17 and revolving linter drum 10 in order to gain the best lint cutting efficiency of the mechanism.

A perforated separating hopper 23 is placed beneath the lint cutting mechanism. The hopper 23 is constructed in length about equal to the length of the linter drum 10, and is open at the top to receive the cut lint and seed which are thrown from the linter drum. The hopper is perforated on the side walls and bottom thereof to permit an air blast to flow through the hopper and also to permit seed to drop from the hopper. An agitator comprising stirring arms 24 fixed to a shaft 25 is journaled in the casing and adapted to rotate in the separating hopper. This agitator 24 works against the mass of cut lint and cotton seed continually stirring up the mass and releasing the cut lint therefrom so that air under pressure will carry the cut lint away. A seed receiving hopper 26 is placed directly beneath the separating hopper 23 and also has an agitator 27. The seed receiving hopper 26 is perforated to permit the seed to drop therefrom and the agitator is employed to continually stir and agitate seed in order to feed and press them through the perforations.

A blower or a centrifugal fan is employed to create an air blast to carry away the lint cut and stripped from seeds which pass through the linter. This blower comprises a fan casing 29 in which is rotatably confined a fan 30 of sufficient number of blades to create a gentle steady blowing air blast. An air conduit 31 connects with the fan casing 29 and with the two above described hoppers. The upper wall of the conduit 31 is attached near the upper edge of the wall of the separating hopper in order that the air blast directed through the conduit will enter the separating hopper 23 on the side thereof and project air directly through the perforations of the hopper. The lower wall of the air conduit 31 is similarly attached to the upper edge of the seed receiving hopper 26 so that a blast of air may be directly blown across the top of the seed receiving hopper 26 and underneath the separating hopper 23. A spreader 32 is inserted in the air conduit 31, and made in the form of a wedge with the pointed end toward the blower. This spreader fills up a part of the conduit 31 and so deflects the air blast that the air under pressure is concentrated against the upper side of the separating hopper 23, and it is also concentrated beneath this hopper and above the seed receiving hopper 26.

A valve 33 is interposed between one side of the spreader and the wall of the conduit for controlling the amount of air passing directed under the separating hopper and over the seed receiving hopper. This valve is made in the form of a sheet metal plate 33 riveted or otherwise attached along one edge to the wall of the conduit 31, with the free end of the sheet metal plate flexibly movable between the spreader and the conduit. Any suitable appliance may be connected with the valve plate 33 for regulating its position in the air passage, such as a hand wheel and screw 33$^a$ which may be rotated to move the free edge of the valve plate in closer relation to the spreader 32.

Another air conduit 35 communicates with the casing and flares out within the casing to gather in the air delivered from the blower 30. The conduit 35 reaches downwardly in the casing of the machine and connects with the upper edge of the seed receiving hopper 26. The upper wall of the conduit 35 terminates in the casing just beneath the revolving picker drum 14. A spreader 36 may be inserted in the conduit 35 adjacent the separating hopper to properly divide the air which is driven through the separating hopper and beneath said hopper. This spreader 36 tends to keep the air properly directed through the machine and prevents currents or whirls from forming in the air system of the machine.

The form of seed linting machine just described employs carder points on both the stationary breast and the revolving drum. In some instances it may be desirable and more practical to employ lint stripper bars on either the breast or the rotating drum.

With particular reference to Figures 3 and 4 there is shown the stationary breast frame part 17 to which is attached a plurality of grooved stripper bars 37. The stripper bars 37 are provided with a great number of V-shaped grooves which multiply the cutting edges of the stripper bars, thereby exposing a great number of stripping and scraping edges to the carder points of the rotating drum. Another form of stripper bar is shown in Figure 6 where the stripper bar 38 is made with a series of transverse grooves which leaves the exposed surface of the bar 38 serrated and roughened with a multiplicity of lint cutting edges. This form of stripper bar 38 when cut and grooved in the manner specified leaves a plurality of upstanding and cone-shaped sharpened points. It is practical to employ these stripper bars 37 or 38 for use in this seed linting machine by fixing the bars to the breast 17, as shown in the detail views.

It is to be understood that any suitable form of seed feeder is applied to the top of the casing to proportionately feed seed into the high speed revolving linter drum 10. The seeds gravitate down on the drum and are carried through the carder breast 17. The carder points or bars 37 or 38 on the stationary breast resist the movement of the seeds holding them back while the carder teeth tend to carry them forward. During this operation the lint is cut, torn, broken and stripped from the seed. Figure 5 shows seeds being tumbled and worked between the carder points of the stationary breast and drum. The seeds fall from the drum and breast toward the separating hopper. The fan 30 is creating an air blast upwardly at an angle through the perforations of the hopper 23 and out through the conduit 35. A large percentage of the lint is immediately caught by the air blast and carried upwardly through the conduit 35 without falling into the hopper 23.

That portion of the lint which does fall into the separating hopper is so stirred and agitated until it is broken away from the seed and driven upwardly through the conduit 35 under the pressure of the air blast. The seed will, under the continual action of the agitator 24, drop through the perforations of the hopper 23 into the seed receiving hopper. Should any lint follow the seed through the perforations of the separating hopper, the air blast underneath thereof will carry away the lint and allow only the cleaned seed to drop into the receiving hopper 26. The agitator 27 stirs the seeds causing them to drop through the perforations of the hopper 26 and be disposed of out through the bottom of the machine. Suitable means are provided for carrying the seed away from the machine which does not form a subject of this invention.

The spreader 32, together with the valve plate 33, act to concentrate the air through the upper side and top portion of the separating hopper to effectively carry the lint away through the conduit 35 before the air blast created by the fan 30. In case very little lint is dropping from the separating hopper with the seed falling therefrom it is then practical to so adjust the valve 33 that very little air will flow beneath the separating hopper. This permits a greater concentration of air above the spreader and through the upper portion of the separating hopper to carry away the cut and stripped lint.

This form of linting machine will find special and advantageous use in and around gin plants. It is simple in construction, economic in operation and unlikely to get out of order; to effectually cleanse the fuzz and lint from the seed, leaving the seed in condition for being worked by oil mills and for planting purposes.

Though I have shown one preferred form of construction and operation, I claim the right of protection as to all such changes as may obviously come within the scope of my invention.

Having thus described the construction and operation of the invention, what I desire to claim and secure by Letters Patent is:

1. A linter of the type having a revolving linter drum and stationary carder breast to cut lint from cotton seed, characterized by having a plurality of separating hoppers to receive the seed and lint falling from the drum and breast, said hoppers being perforated to allow the linted seed to pass therefrom, and air pressure means to carry the lint away from the hoppers.

2. A cotton seed linter of the type having a revolving linter drum to cut lint from cotton seed, and having separating hoppers with perforations to separate the seed from the lint, and air pressure means to blow air through hoppers to carry away the lint.

3. A cotton seed linter of the type having a revolving linter drum to cut lint from cotton seed, and having separating hoppers with perforations to separate the seed from the lint, air pressure means arranged to blow air through the side of one hopper to carry away the lint, and another separating hopper placed under the first mentioned hopper to receive and dispose of the cleaned seed.

4. A cotton seed linting machine having a cotton seed linting means which cuts the lint from the seed, characterized by having a separating hopper which receives the cut lint and seed, said hopper being perforated, and air pressure means arranged to blow through the sides of the perforated hopper and up through the contents thereof and out of the hopper to carry away the lint.

5. A cotton seed linter having a linting means which cuts or tears the lint from seed, a separating hopper which receives the cut lint and seed acting to separate the seed from the lint, a seed receiving hopper placed beneath the separating hopper to catch the separated seed, and air pressure means arranged to blow through the separating hopper and over the receiving hopper to carry away the lint.

6. A cotton seed machine having a linter to cut lint from seed, a separating hopper to receive the linted seed and lint, a seed receiving hopper placed beneath the separating hopper, said hoppers provided with perforations, air pressure means employed to blow through the perforated separating hopper and between the two hoppers to carry away the lint.

7. A cotton seed machine having a linting mechanism to cut lint from seed, and having a separating hopper, and a seed receiving hopper, said separating hopper having perforations through which the seed drop into the seed receiving hopper, an air conduit arranged to project air through the side of the separating hopper to carry lint from the hopper, and also arranged to project air underneath the hopper to carry away small quantities of lint which finds its way through the bottom of said hopper.

8. A cotton seed machine having a linting mechanism to cut lint from seed, a separating hopper, and a seed receiving hopper, said separating hopper having perforations through which the seed drop into the seed receiving hopper, an air conduit arranged to project air through the side of the separating hopper to carry lint from the hopper, and also arranged to project air underneath the hopper to carry away small quantities of lint which finds its way through the bottom of said hopper, and a valve arranged in the aforesaid conduit to regulate the amount of air projected under or over the separating hopper.

9. A machine having a linting mechanism to cut lint from seed, a separating hopper, and a seed receiving hopper, said separating hopper having perforations through which the seed drop into the seed receiving hopper, an air conduit arranged to project air through the side of the separating hopper to carry lint from the hopper, and also arranged to project air underneath the hopper to carry away small quantities of lint which finds its way through the bottom of said hopper, and a spreader inserted in the conduit to concentrate the air above and below the separating hopper.

10. A machine having a linting mechanism to cut lint from seed, a separating hopper, and a seed receiving hopper, said separating hopper having perforations through which the seed drop into the seed receiving hopper, an air conduit arranged to project air through the side of the separating hopper to carry lint from the hopper, and also arranged to project air underneath the hopper to carry away small quantities of lint which finds its way through the bottom of said hopper, a spreader inserted in the conduit to concentrate the air above and below the separating hopper, and a valve interposed between the spreader and wall of the conduit to regulate the amount of air directed beneath the separating hopper.

11. A cotton seed linting machine comprising, a lint cutting means which strips the fuzz and lint from the seed, hoppers to receive the stripped lint and seed, stirring and agitating means within the hoppers, means employed to project air against the hoppers which presses and drives the loose lint from seed being agitated, and a conduit for conducting away the separated lint.

12. A cotton seed linting machine comprising, a lint cutting and stripping means for removing lint and fuzz from cotton seed, receiving and separating hoppers to receive and subsequently separate the lint from the seed and dispose of the seed, an air conduit to blow air on, through, and over the hoppers to carry the lint away and a sheet metal plate attached to the wall of the conduit being movable across the conduit to vary the size of the conduit to regulate the amount of air directed toward the hoppers.

13. A cotton seed linting machine comprising, a revolving linter drum, a stationary carder breast coacting with the linter drum to cut and strip lint from cotton seed, a hopper beneath the aforesaid parts to catch the seed and lint falling therefrom and to effect separation of the lint from the seed, an agitator within the hopper to facilitate the separation, a wind blast means to carry the separated lint from the hopper, and another hopper arranged to catch the seed falling from the first named hopper.

14. A cotton seed linting machine having a cotton seed linting means which cuts the lint from the seed, comprising a separating hopper which receives the cut lint and seed, said hopper being perforated, and air pressure means arranged to blow through the sides of the perforated hopper, and up through the contents thereof and out of the hopper to carry away the lint, and a stirring device in the hopper to agitate the seed as the air blows up through the said contents.

15. A cotton seed linting machine comprising, a lint cutting and stripping means for removing lint and fuzz from cotton seed, receiving and separating hoppers to receive and subsequently separate the lint from the seed and dispose of the seed, an air conduit to blow air on, through and over the hoppers to carry the lint away, and a valve included in the conduit to regulate the passage of air therethrough.

In testimony whereof I hereunto affix my signature.

FELIX E. VOORHIES.